Jan. 1, 1963  G. W. ELGER ET AL  3,071,459
PRODUCTION OF HAFNIUM METAL
Filed Oct. 17, 1960
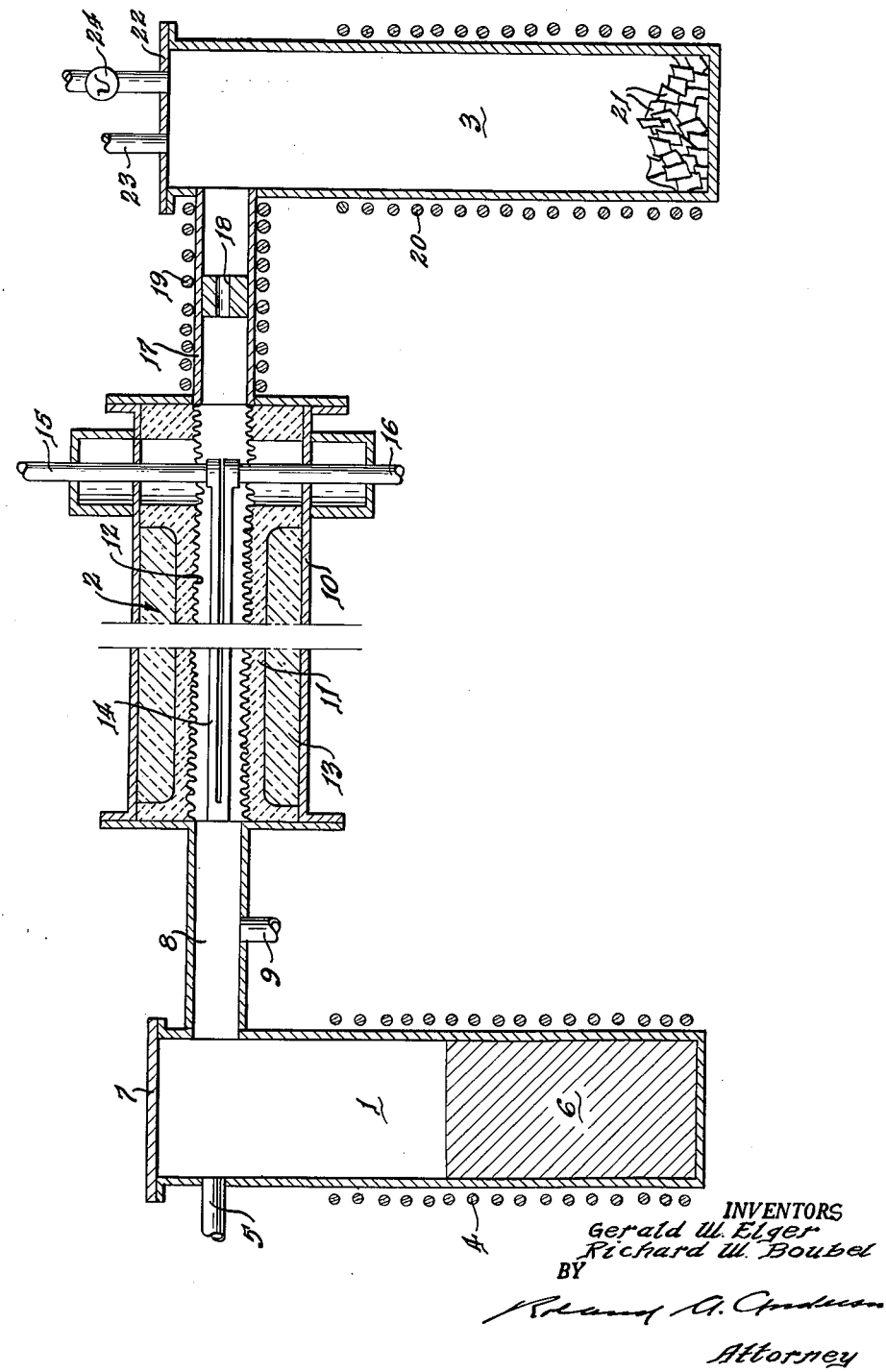
INVENTORS
Gerald W. Elger
Richard W. Boubel
BY
Roland A. Anderson
Attorney

United States Patent Office 3,071,459
Patented Jan. 1, 1963

3,071,459
PRODUCTION OF HAFNIUM METAL
Gerald W. Elger, Albany, Oreg., and Richard W. Boubel, Cincinnati, Ohio, assignors to the United States of America as represented by the United States Atomic Energy Commission
Filed Oct. 17, 1960, Ser. No. 96,058
7 Claims. (Cl. 75—84.5)

This invention deals with the production of hafnium metals of group IVA of the periodic system of the elements, and of niobium, tantalum and molybdenum by the reduction of their chlorides with magnesium and in particular with the production of hafnium metal from the chloride.

Hafnium chloride and the chlorides of the other metals listed above are often prepared by the chlorination of scrap metal or, in the case of hafnium, by the chlorination of an extruded mixture of hafnium oxide and carbon. These chlorides are mostly contaminated with oxychlorides and oxides which are not easily reduced with magnesium and thus contaminate the metal. These oxides are the cause of undesirable brittleness, and metals containing them are difficult to work or fabricate. Therefore these oxygen-containing chlorides have to be subjected to a purifying process prior to reduction, so that a ductile metal can be produced.

Various processes have been investigated for this purpose. For instance, it has been tried to volatilize or sublime the chlorides away from the oxygen-containing compounds; however, in many cases the chlorides and the oxygen-containing compounds evaporate at about the same temperature so that the object cannot be accomplished. The raw metal chlorides have been reduced as such with magnesium and the metals produced were then purified, preferably by the De Boer-Van Arkel iodide decomposition process or by electron-beam melting. Both of these processes, however, are very expensive.

It is an object of this invention to provide a process for the production of hafnium and other similar metals of a high degree of ductility so that the metal can be worked by various metallurgical fabrication processes.

It has been found that, if the gaseous metal chloride is reacted, prior to reduction, with chlorine gas at elevated temperature in the presence of carbon, metal oxide and oxychloride are converted to chloride, and the oxygen is removed as carbon monoxide. It has also been found that, if the gaseous pure metal chloride is reacted with molten magnesium, the metal chloride is immediately reduced, and metal in the form of sponge is deposited on the magnesium.

The process of this invention thus comprises reacting a raw, metal-oxychloride- and metal-oxide-containing, metal chloride in gaseous form with chlorine in the presence of carbon at elevated temperature whereby the oxychloride and the oxide are converted to chloride and carbon monoxide is formed; reacting said metal chloride with molten magnesium metal whereby the metal chloride is reduced to the metal and condensed; and cooling the metal formed for solidification.

The temperature for chlorination depends on the boiling point of the chloride to be treated. For hafnium chloride the preferred temperature is within the range of 1000 to 1200° C. The chlorination should be carried out in the absence of oxygen so that no reoxidation takes place. Either an atmosphere of pure chlorine gas or an atmosphere of chlorine plus an inert gas, such as argon or helium, is satisfactory for the reaction.

For the reduction of the purified metal chloride an inert atmosphere is also maintained in the reduction vessel. A temperature of between 750 and 850° C. was found best for this step. The quantity of magnesium should be in excess of that stoichiometrically required. A weight ratio of hafnium chloride:magnesium of between 3.17 and 3.33 was found to be the optimum amount; this is about twice the quantity required for the reaction.

The metal sponge obtained by the reduction with magnesium is then vacuum-heated to vaporize excess magnesium and the magnesium chloride formed in the reaction; heating at about 960° C. for 18 hours has been found satisfactory for this purpose. Thereafter the sponge can be consolidated into one massive piece by arc-melting, using a tungsten electrode.

While any apparatus known in the art for the reaction of gases can be used for the process of this invention and also any reduction reactor is suitable for the reduction of the purified chloride with magnesium, the applicants prefer an apparatus that will now be described and that is shown in the attached drawing. This drawing is a longitudinal diagrammatic section.

The apparatus consists of three principal sections, a sublimation vessel 1, a chlorination cylinder 2 and a reduction retort 3. These three sections are interconnected so that the gaseous reagents can pass from one to the other.

The sublimation vessel 1 is a vertical cylindrical container which on its outside is provided with heating coils 4. The vessel 1 is equipped at its upper end with an inlet pipe 5 for an inert gas, through which helium, argon or the like can be introduced. The vessel is filled with raw metal chloride 6; it can be hermetically sealed by a cover 7. There is a connecting tube 8 arranged between the sublimation vessel 1 and the chlorination cylinder 2, and an inlet pipe 9 leads into said connecting tube. This inlet pipe can be connected with a chlorine source (not shown).

The chlorination cylinder 2 comprises an Inconel shell 10 and a graphite liner 11 concentrically arranged within said shell; this liner has grooves 12 extending around the interior so as to bring about a turbulent motion of the metal chloride and chlorine gases and thereby accomplishes an intense mixing. The liner 11 is spaced from the Inconel shell, and the space therebetween is filled with lampblack or other carbon black 13 for heat insulation. Within the liner 11 is a graphite heating element 14 for electrical resistance heating is axially arranged; this resistor is split to permit thermal expansion without causing damage of it and of other parts of the apparatus. The resistor 14 extends through the entire length of the liner 11. Graphite electrodes 15 and 16 supply electricity to the resistor 14, and cooling means (not shown) are provided for these electrodes.

Between the reduction retort 3 and the chlorination cylinder 2 there is arranged a connecting member 17 that has a narrow orifice 18. Coils 19 are placed around this member 17 through which either a cooling or a heating medium can be passed. The reduction retort 3, too, is provided with a heating coil 20. The retort is filled with pieces 21 of magnesium. The reduction retort can be hermetically sealed by means of a lid 22. The lid is provided with an inlet pipe 23 for the introduction of an inert gas and with a bleeder valve 24 for withdrawal of the noncondensable carbon monoxide.

In operating the apparatus just described for the production of hafnium metal, for instance, by the process of this invention, hafnium chloride is heated in the sublimation vessel 1 to a temperature of between 1000 and 1200° C. by means of heating coils 4, and at the same time helium gas, for instance, is introduced through inlet pipe 5. The temperature of the graphite resistor 14 at the same time is raised to between 1000 and 1200° C., and chlorine gas is introduced through inlet pipe 9.

The purified oxygen-free hafnium chloride passes through the orifice 18 into the reduction retort 3. This retort is heated by means of coils 20, and it contains an inert gas introduced through inlet 23. In the beginning of the reduction reaction the temperature is maintained at about 750 to 775° C.; however, towards the end of the reaction, in order to obtain quantitative conversion to the metal, the temperature is raised to between 800 and 850° C. The hafnium metal formed condenses on the magnesium 21 in the form of sponge (not shown).

The orifice 18 serves as a valve. When operation in the chlorination cylinder is to be interrupted, the orifice is cooled by means of cold water, air or other cooling medium that is passed through coil 19. The hafnium chloride then condenses in the orifice, gradually forms a plug which in turn interrupts the operation. On the other hand, when operation is to be resumed, a heating medium is passed through the coil 19 whereby the hafnium sublimes and the orifice is opened for the passage of additional purified hafnium chloride.

In the following, an example will be given to illustrate the process of this invention.

*Example*

Two parallel tests were carried out, one with hafnium chloride pretreated by one of the methods used heretofore, namely by simply degassing at elevated temperature, the other one with a hafnium chloride that had been treated by the process of this invention.

For this pretreatment according to the invention, about 700 grams of raw hafnium chloride were sublimed and the gas was mixed with about 450 grams of chlorine gas; this mixture was passed through a graphite liner constructed as described above. The temperature of the chlorinator was maintained at between 1000 and 1200° C.

Both hafnium chlorides were then reduced separately by the same process, using 750 grams of hafnium chloride in each instance and reacting it with 210 grams of magnesium of about 800° C. The metal yield was about 85%. Both hafnium metals were heated to 960° C. for 18 hours in a vacuum for removal of magnesium and magnesium chloride, and the sponge metals were then arc-melted into buttons. One button of each run was analyzed for oxygen content, and its hardness was also determined. The hafnium button produced from the thermally degassed hafnium chloride contained 600 parts per million of oxygen and had a Rockwell hardness, scale A, of 60. The hafnium prepared from the hafnium chloride purified by the process of this invention contained 350 parts per million of oxygen and had a hardness of 53.

In a similar set of two parallel experiments, the hafnium obtained by conventional procedures had an oxygen content of about 1800 parts per million, while the hafnium obtained from chloride treated by the process of this invention had an oxygen content of 600 parts per million.

Hafnium has a great number of applications. For instance, on account of its high neutron-capture cross section, it can be used as control material for nuclear reactors. Furthermore, hafnium is used for filaments in incandescent lights.

Although the process has been primarily described as applied to the production of hafnium, it is understood that it can also be used for the production of zirconium, titanium, tantalum, molybdenum and niobium from the chlorides.

It will be understood that this invention is not to be limited to the details given herein but that it may be modified within the scope of the appended claims.

What is claimed is:

1. A process of producing hafnium metal of a high degree of purity and ductility, said process consisting in reacting hafnium chloride containing hafnium oxychloride and hafnium oxide as impurities in gaseous form with chlorine gas in the presence of carbon at elevated temperature whereby oxychloride and oxide are converted to hafnium chloride vapor; reacting said hafnium chloride vapor with an excess of molten magnesium metal whereby the hafnium chloride is reduced to the metal and the hafnium metal is condensed on the magnesium metal; and cooling the hafnium metal formed for solidification.

2. The process of claim 1 wherein chlorination and reduction are carried out in an oxygen-free atmosphere.

3. The process of claim 1 wherein chlorination is carried out at a temperature of between 1000 and 1200° C. and reduction is carried out at a temperature of between 750 and 850° C.

4. The process of claim 2 wherein chlorination and reduction are carried out in an atmosphere of helium.

5. The process of claim 3 wherein magnesium is used in a quantity about double the amount stoichiometrically required.

6. A process of producing hafnium metal of a high degree of ductility, consisting in reacting gaseous hafnium chloride contaminated with hafnium oxychloride and hafnium oxide with chlorine gas in the presence of carbon at a temperature of between 1000 and 1200° C. while an atmosphere of helium is maintained, whereby hafnium oxychloride and oxide are converted to hafnium chloride vapor; reacting said hafnium chloride vapor with an excess of molten magnesium metal at a temperature of between 775 and 850° C. while a helium atmosphere is maintained, whereby the hafnium chloride is reduced to the metal, magnesium chloride is formed and the hafnium metal is condensed as sponge on the magnesium; and cooling the hafnium metal formed for solidification.

7. The process of claim 6 wherein the hafnium sponge is subjected to vacuum distillation for removal of the excess magnesium and the magnesium chloride formed.

References Cited in the file of this patent

UNITED STATES PATENTS

| | | |
|---|---|---|
| 2,267,041 | Patterson | Dec. 23, 1941 |
| 2,586,134 | Winter | Feb. 19, 1952 |
| 2,758,831 | Winter | Aug. 14, 1956 |
| 2,870,073 | Merlub-Sobel et al. | Jan. 20, 1959 |
| 2,890,112 | Winter | June 9, 1959 |
| 2,915,384 | Walsh | Dec. 1, 1959 |
| 2,938,783 | Ustan | May 31, 1960 |
| 2,969,852 | Jacobson | Jan. 31, 1961 |

FOREIGN PATENTS

| | | |
|---|---|---|
| 786,760 | Great Britain | Nov. 27, 1957 |

OTHER REFERENCES

Journal of the Electrochemical Society, vol. 102, No. 5, pages 243–245, 1955.